US012761058B2

(12) United States Patent
Tayler

(10) Patent No.: US 12,761,058 B2
(45) Date of Patent: Oct. 13, 2026

(54) BOX WINE WEIGHING DEVICE

(71) Applicant: Liam Tayler, Lunenburg (CA)

(72) Inventor: Liam Tayler, Lunenburg (CA)

( * ) Notice: Subject to any disclaimer, the term of this patent is extended or adjusted under 35 U.S.C. 154(b) by 258 days.

(21) Appl. No.: 18/778,191

(22) Filed: Jul. 19, 2024

(65) Prior Publication Data

US 2026/0022961 A1 Jan. 22, 2026

(51) Int. Cl.
*G01F 23/20* (2006.01)
*G01G 19/414* (2006.01)
*G01G 23/37* (2006.01)

(52) U.S. Cl.
CPC ........... *G01F 23/20* (2013.01); *G01G 19/414* (2013.01); *G01G 23/3728* (2013.01)

(58) Field of Classification Search
CPC ... G01G 19/414; G01G 23/3728; G01F 23/20
See application file for complete search history.

(56) References Cited

U.S. PATENT DOCUMENTS 4,372,405 A 2/1983 Stuart
4,800,973 A 1/1989 Angel
6,504,481 B2 1/2003 Teller
7,256,357 B1 8/2007 Kesselman
D677,101 S 3/2013 Mullins
8,954,347 B1 * 2/2015 Einfalt ................. G06Q 10/087 705/16
9,102,508 B2 8/2015 O'Keefe, Jr.
9,111,312 B2 8/2015 Jones
9,188,476 B2 * 11/2015 Volker ................... B01D 61/04
10,074,074 B2 * 9/2018 Edwards .............. G06Q 10/087
12,373,902 B1 * 7/2025 Mula .................. G01G 19/4144
12,561,750 B2 * 2/2026 Mula ...................... G06Q 50/12
2016/0264394 A1 * 9/2016 Hershberger ........ B67D 1/0888
2019/0072424 A1 * 3/2019 Clément ................ G01G 19/00
2019/0223589 A1 * 7/2019 Acosta Villanueva ...................... G01G 19/52
2020/0122993 A1 * 4/2020 De Zulueta .......... B67D 1/0008
2022/0133069 A1 * 5/2022 Roth ...................... G01G 19/40 73/149
2023/0245185 A1 * 8/2023 Morita ............... G01G 19/4146 705/26.1

FOREIGN PATENT DOCUMENTS

SE 0901186 A1 * 3/2011 ............. G01G 19/58
WO WO0143096 6/2001
WO WO-2008057020 A1 * 5/2008 ............. G01G 19/56
WO WO-2008100199 A1 * 8/2008 ............... G01G 5/06

* cited by examiner

*Primary Examiner* — Natalie Huls

(57) ABSTRACT

A box wine weighing device for calculating the volume of wine in a box of wine includes a personal electronic device which stores a database comprising a weight calculation program. A scale is structured to accommodate a box of wine thereby enabling the scale to weigh the box of wine. The scale is in remote communication with the personal electronic device to calculate the volume of wine that remains in the box of wine thereby enabling a user to determine how many glasses of wine are left in the box of wine. A gripping unit is movably integrated into the scale to grip the box of wine for retaining the box of wine on the scale. A locking unit is movably integrated into the scale and the locking unit ensures the gripping unit is releasably secured against the box of wine.

12 Claims, 7 Drawing Sheets

BOX WINE WEIGHING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to weighing devices and more particularly pertains to a new weighing device for calculating the volume of wine in a box of wine. The device includes a scale upon which a box of wine can be placed and a gripping unit movably integrated into the scale for securing the box of wine on the scale. The scale is in wireless communication with a personal electronic device thereby enabling a weight calculation program stored in the personal electronic device to calculate the volume of wine contained in the box of wine. In this way the personal electronic device can inform a user of how many glasses of wine remain in the box of wine as well as make recommendations of the appropriate daily consumption of wine for the user.

(2) Description of Related Art Including Information Disclosed Under 37 CFR 1.97 and 1.98

The prior art relates to weighing devices including a variety of electronic scale devices for measuring the weight of any object and a beverage container weighing device which includes an electronic scale that is attachable to a bottom of a beverage bottle for measuring the weight of the beverage bottle to calculate the volume of a beverage contained in the beverage bottle and an electronic means of communication between the electronic scale and a point of sale in a tavern or other retail environment that sells beverages. In no instance does the prior art disclose a wine box scale device that includes an electronic scale upon which a box of wine can be positioned and a gripping unit movably integrated into the scale for securing the box of wine to the scale and a personal electronic device which is in wireless communication with the scale thereby enabling a weight calculation program stored in the personal electronic device to calculate the number of glasses of wine that remain in the box of wine.

BRIEF SUMMARY OF THE INVENTION

An embodiment of the disclosure meets the needs presented above by generally comprising a personal electronic device which stores a database comprising a weight calculation program. A scale is structured to accommodate a box of wine thereby enabling the scale to weigh the box of wine. The scale is in remote communication with the personal electronic device to calculate the volume of wine that remains in the box of wine thereby enabling a user to determine how many glasses of wine are left in the box of wine. A gripping unit is movably integrated into the scale to grip the box of wine for retaining the box of wine on the scale. A locking unit is movably integrated into the scale and the locking unit ensures the gripping unit is releasably secured against the box of wine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
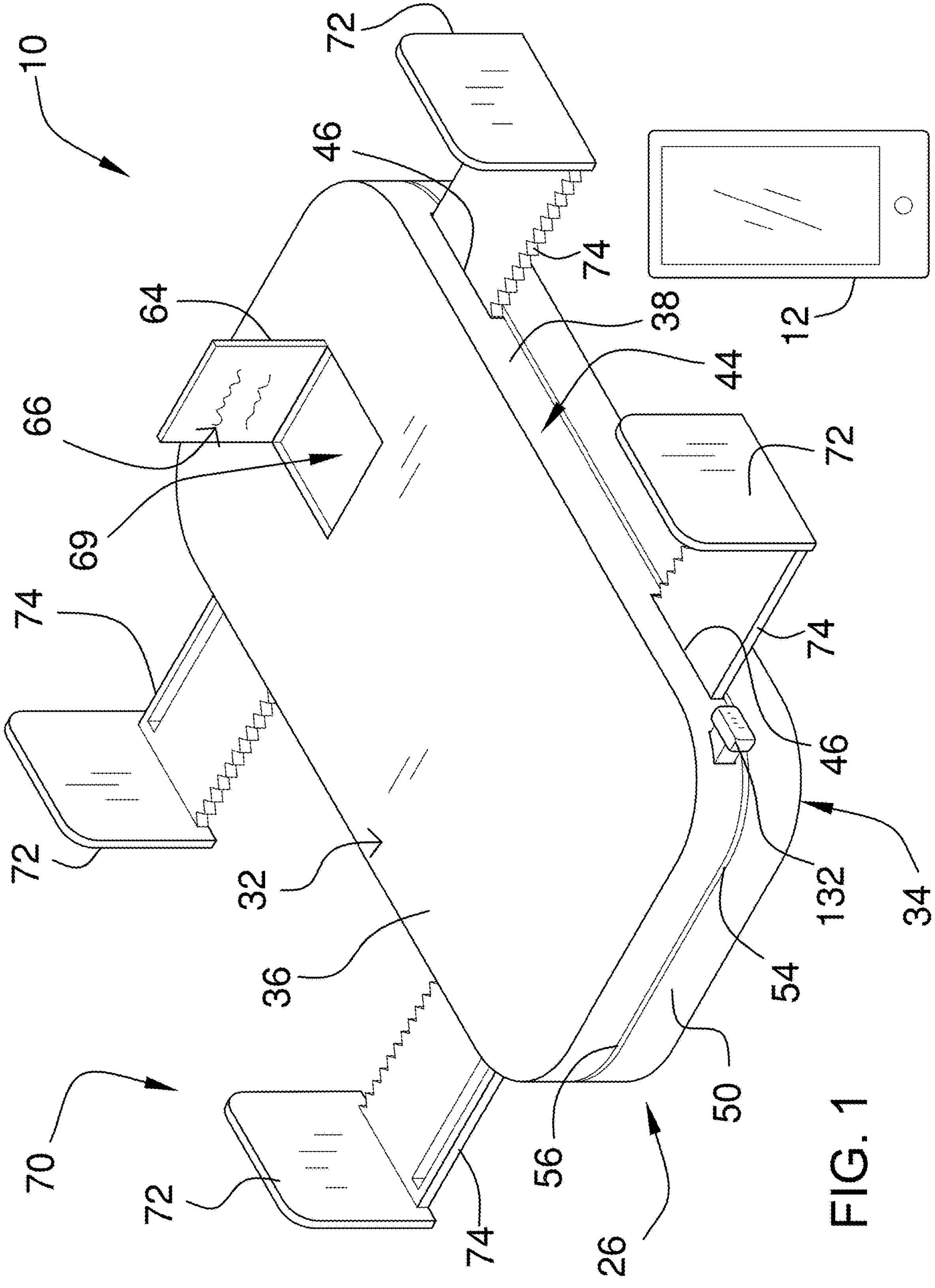
FIG. 1 is a top perspective view of a box wine weighing device according to an embodiment of the disclosure.
Figure 2:
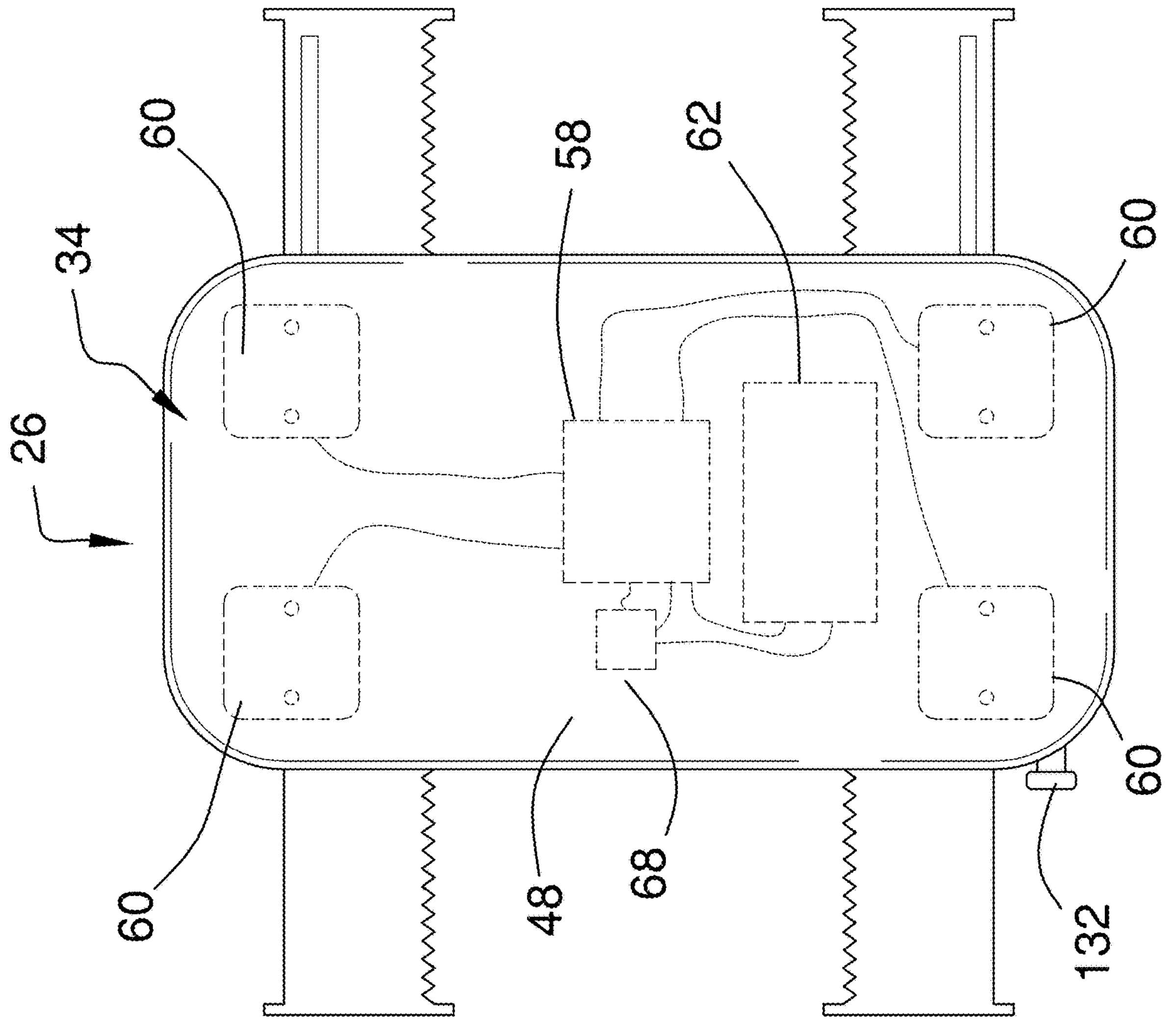
FIG. 2 is a bottom phantom view of an embodiment of the disclosure.
Figure 4:
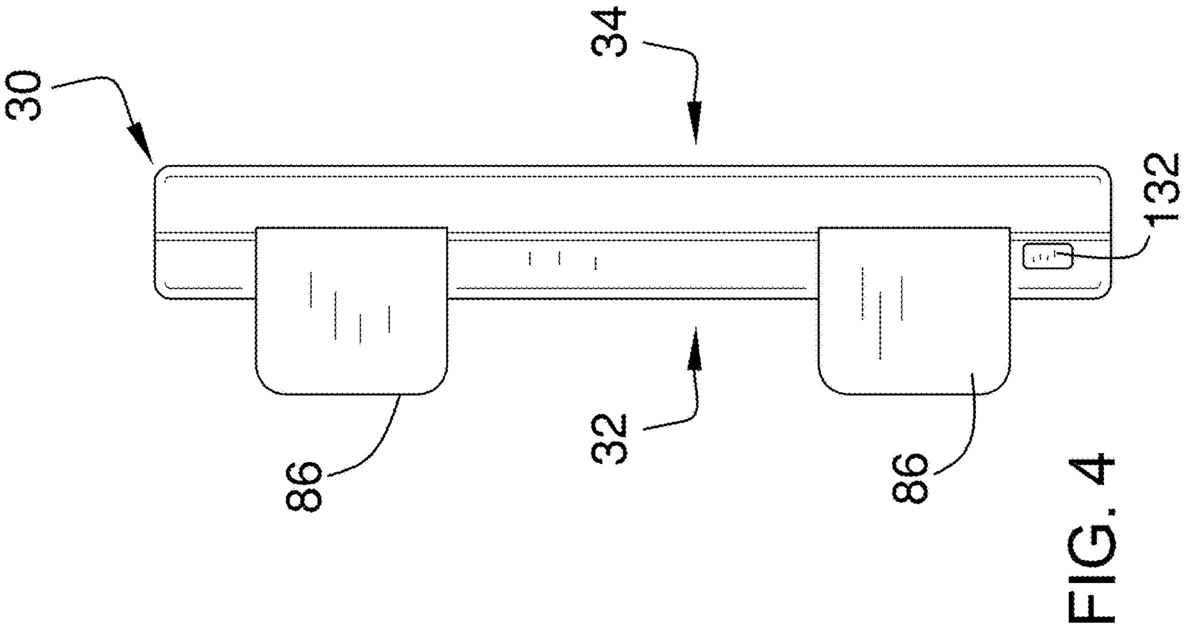
FIG. 4 is a right side view of an embodiment of the disclosure.
Figure 3:
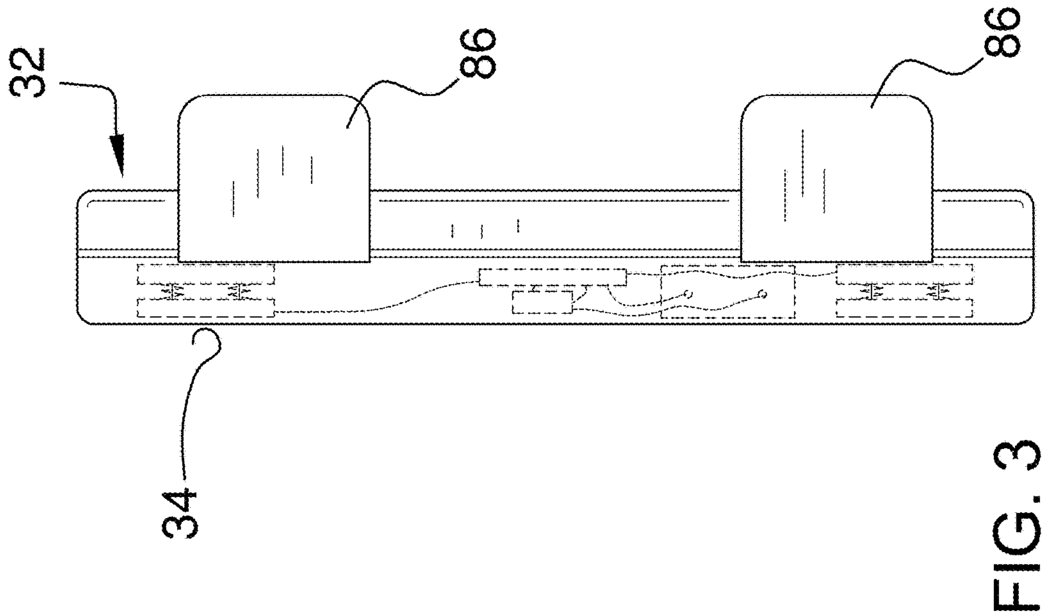
FIG. 3 is a left side phantom view of an embodiment of the disclosure.
Figure 5:
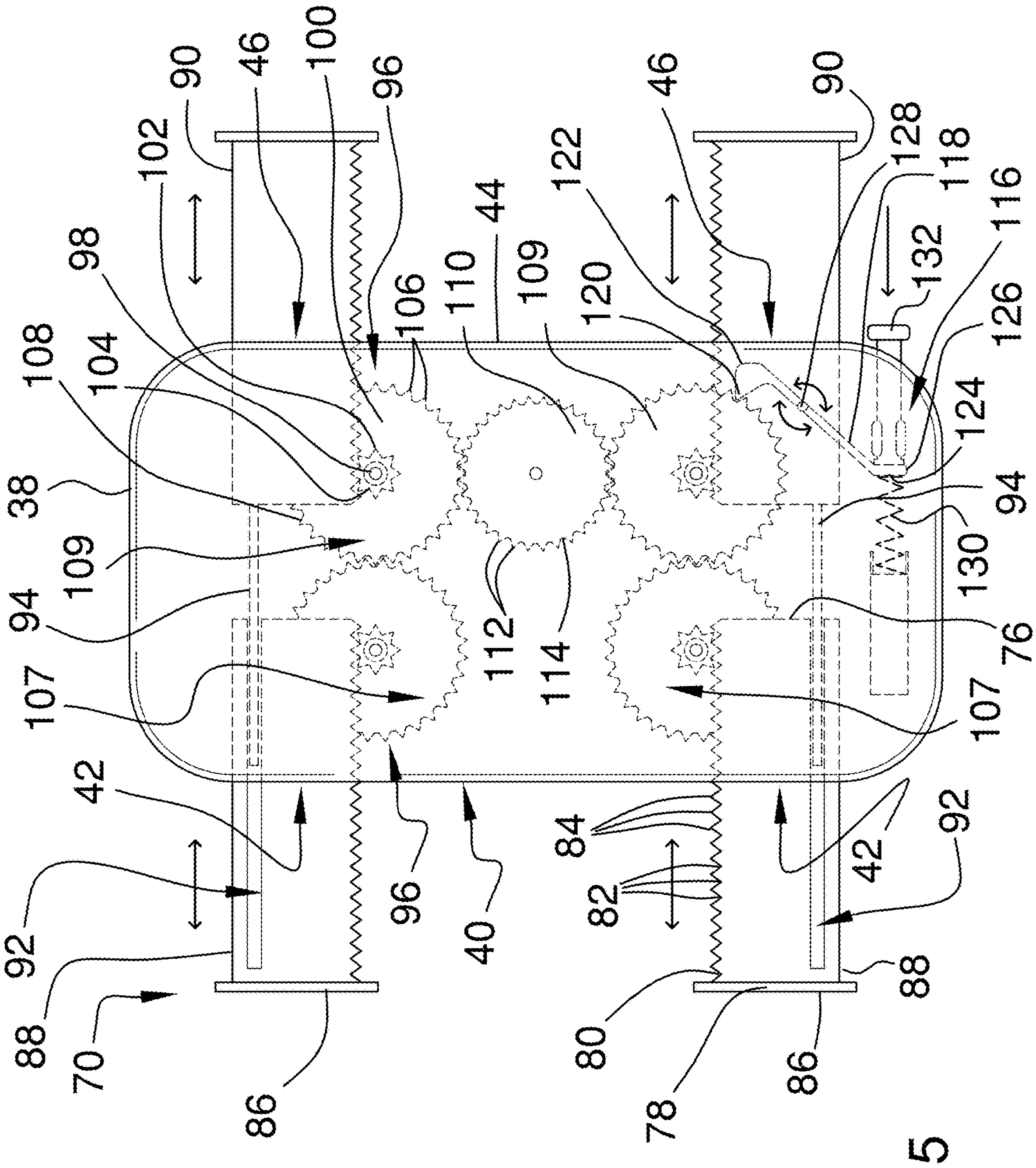
FIG. 5 is a top phantom view of an embodiment of the disclosure.
Figure 6:
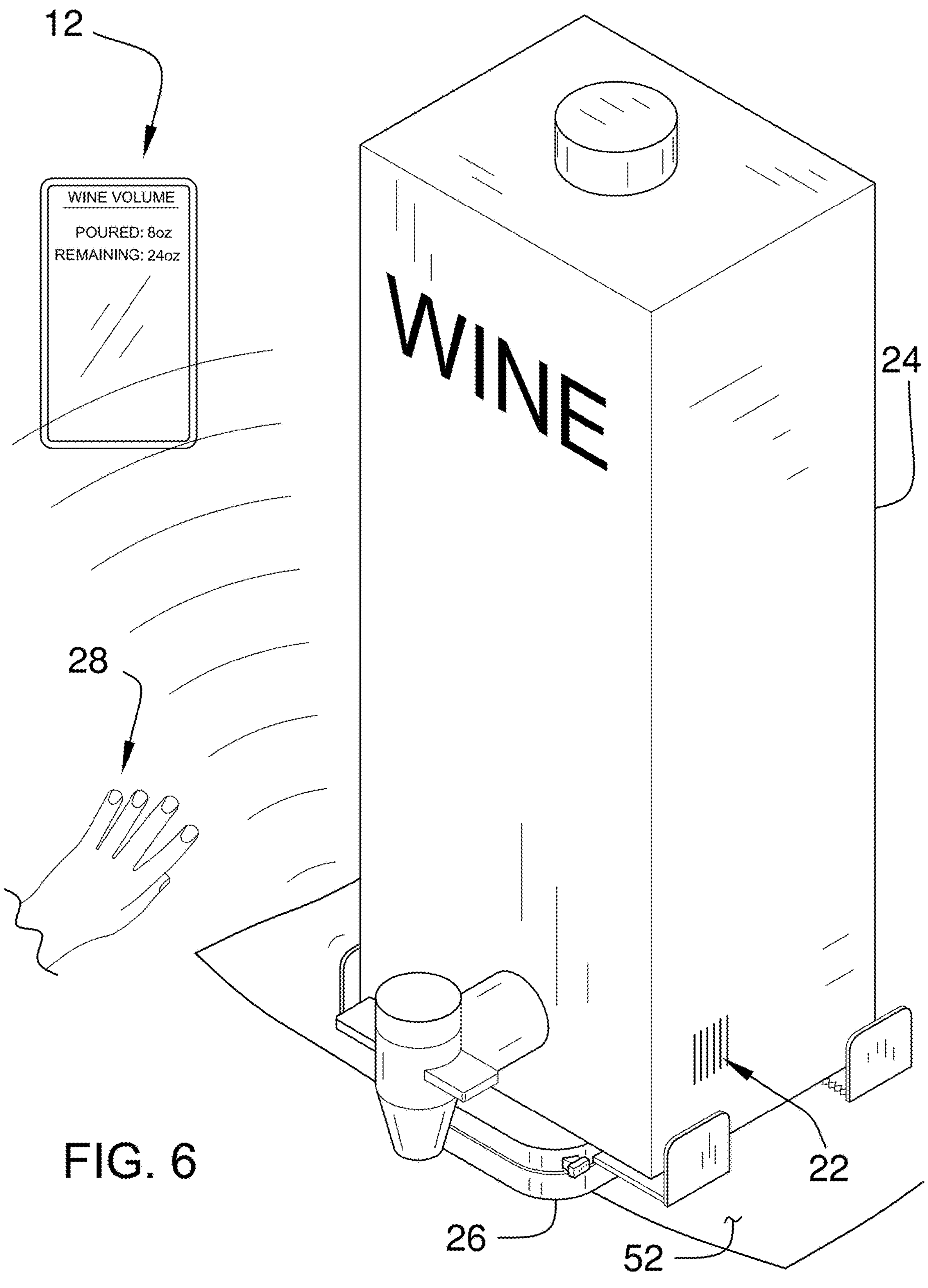
FIG. 6 is a perspective in-use view of an embodiment of the disclosure.
Figure 7:
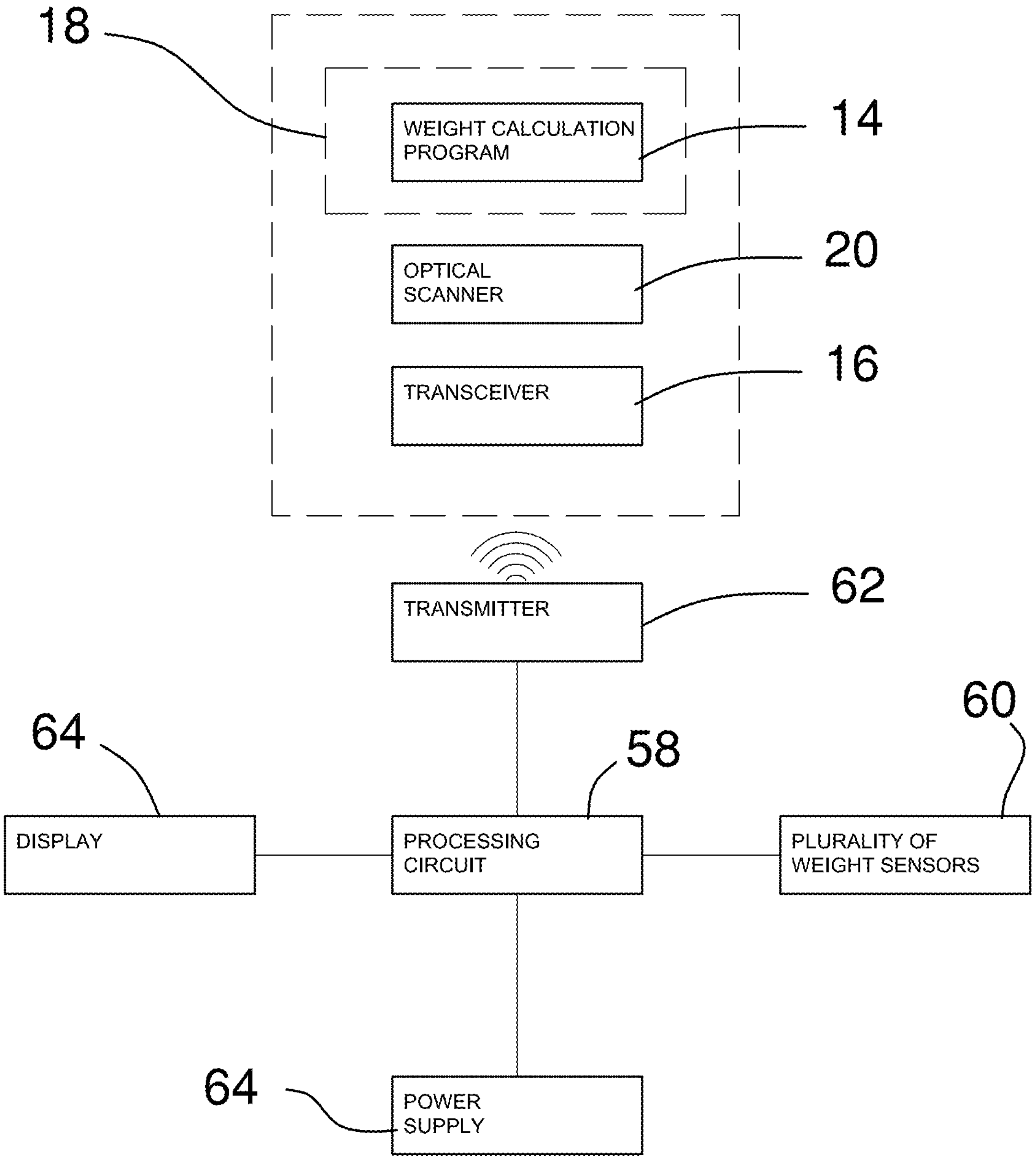
FIG. 7 is a schematic view of an embodiment of the disclosure.
Figure 8:
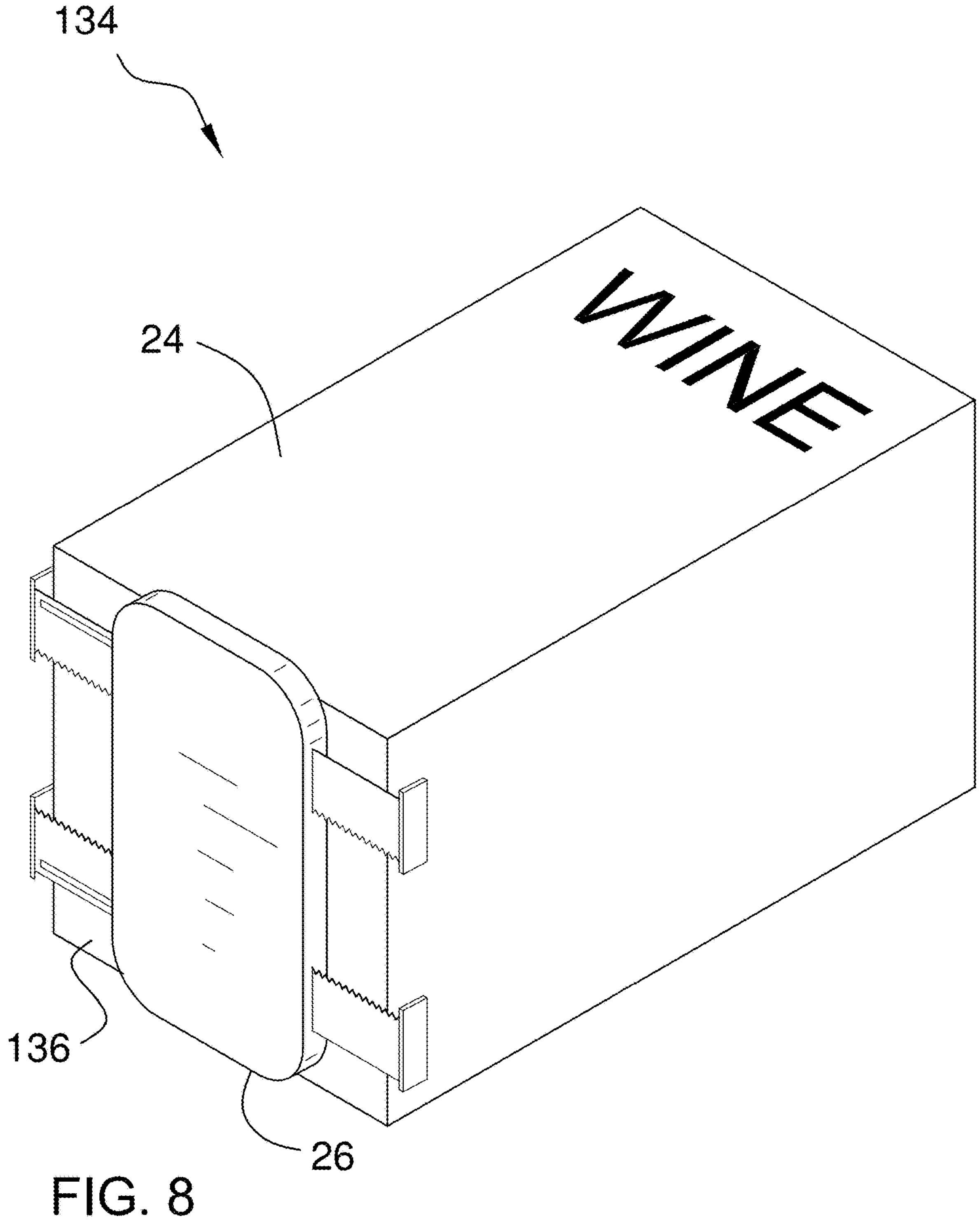
FIG. 8 is a bottom perspective view of an alternative embodiment of the disclosure.

With reference now to the drawings, and in particular to FIGS. 1 through 8 thereof, a new weighing device embodying the principles and concepts of an embodiment of the disclosure and generally designated by the reference numeral 10 will be described.

As best illustrated in FIGS. 1 through 8, the box wine weighing device 10 generally comprises a personal electronic device 12 which stores a database comprising a weight calculation program 14. The personal electronic device 12 includes a transceiver 16 and an electronic memory 18 and an optical scanner 20. The database is stored in the electronic memory 18 and the optical scanner 20 is enabled to read a bar code 22 on a box of wine 24 thereby enabling data pertaining to the box of wine 24 to be uploaded into the electronic memory 18. The personal electronic device 12 may comprise a smartphone or other similar type of device and the transceiver 16 may comprise a radio frequency transceiver which may employ Bluetooth communication protocols. Furthermore, the optical scanner 20 enables the weight of the packaging of the box of wine 24 and the weight of the volume of wine contained in the box of wine 24 to be uploaded into the electronic memory 18.

A scale 26 is provided with is structured to accommodate the box of wine 24 thereby enabling the scale 26 to weigh the box of wine 24. The scale 26 is in remote communication with the personal electronic device 12 thereby enabling the weight calculation program 14 in the personal electronic device 12 to calculate the volume of wine that remains in the box of wine 24. In this way the personal electronic device 12 enables a user 28 to determine how many glasses of wine are left in the box of wine 24. Furthermore, the weight calculation program 14 enables a user 28 profile to be entered which includes, but is not limited to, the sex of the user 28 and the weight of the user 28 and the height of the user 28. In this way the weight calculation program 14 can analyze how many glasses of wine would be appropriate to be consumed over an hour, for example, with respect to the physiological characteristics of the user 28. Additionally, the weight calculation program 14 may be a smartphone application or other similar type of software.

The scale 26 comprises a housing 30 that has a top half 32 which is movably attached to a bottom half 34 and the top half 32 has a top wall 36 and a perimeter wall 38 extending downwardly from the top wall 36. A first lateral side 40 of the perimeter wall 38 has a pair of first slots 42 each extending into an interior of the housing 30 and a second lateral side 44 of the perimeter wall 38 has a pair of second slots 46 each extending into the interior of the housing 30. The bottom half 34 has a bottom wall 48 and a perimeter wall 50 extending upwardly from the bottom wall 48. Furthermore, the bottom wall 48 is positionable on a horizontal support surface 52 thereby enabling the box of wine 24 to be positioned on the top wall 36. A lower edge 54 of the perimeter wall 38 of the top half 32 is spaced from an upper edge 56 of the perimeter wall 50 of the bottom half 34.

The scale 26 includes a processing circuit 58 that is positioned within the housing 30 and a plurality of weight sensors 60 which is each positioned between the top wall 36 of the top half 32 and the bottom wall 48 of the bottom half 34. In this way the plurality of weight sensors 60 are enabled to sense the weight of the box of wine 24 when the box of wine 24 is positioned on the top wall 36 of the top half 32. Additionally, each of the plurality of weight sensors 60 is electrically coupled to the processing circuit 58 and each of the plurality of weight sensors 60 may comprise an electronic weight sensor that has a sensitivity range which may range between approximately 100 grams and 10.0 kg.

The scale 26 includes a transmitter 62 that is positioned within the housing 30 and the transmitter 62 is electrically coupled to the processing circuit 58 thereby enabling the transmitter 62 to receive the weight sensed by the plurality of weight sensors 60. Furthermore, the transmitter 62 is in wireless communication with the transceiver 16 in the personal electronic device 12. The transmitter 62 broadcasts the weight sensed by the plurality of weight sensors 60 to the transceiver 16 thereby enabling the weight calculation program 14 in the electronic memory 18 of the personal electronic device 12 to calculate the volume of wine remaining in the box of wine 24. Additionally, the transmitter 62 may comprise a radio frequency transmitter or the like and the transmitter 62 may employ Bluetooth communication protocols.

The scale 26 includes a display 64 that is pivotally integrated into the top wall 36 of the top half 32 of the housing 30 and the display 64 is electrically coupled to the processing circuit 58. The display 64 is positionable in a deployed position having the display 64 extending upwardly from the top wall 36 of the top half 32 such that the display 64 is visible to a user 28. Conversely, the display 64 is positionable in a stored position having the display 64 lying on a plane that is oriented coplanar with the top wall 36 of the top half 32. The display 64 displays indicia 66 comprising numbers and letters to visually communicate the weight sensed by the plurality of weight sensors 60 when the display 64 is in the deployed position. Additionally, the display 64 may comprise a light emitting diode display or other type of electronic display 64. The scale 26 includes a power supply 68 that is positioned within the housing 30 and the power supply 68 is electrically coupled to the processing circuit 58 and the power supply 68 comprises at least one battery. As is most clearly shown in FIG. 1, the top wall 36 of the of the top half 32 of the housing 30 has a recess 69 which receives the display 64 when the display 64 is positioned in the stored position to enable to display 64 to lie flush with the top wall 36 of the top half 32.

A gripping unit 70 is provided and the gripping unit 70 is movably integrated into the scale 26. The gripping unit 70 includes a plurality of grips 72 which can each be extended an adjustable distance from the scale 26 thereby enabling the plurality of grips 72 to grip the box of wine 24 for retaining the box of wine 24 on the scale 26. The gripping unit 70 comprises a plurality of arms 74 which is each slidably positioned in the perimeter wall 68 of the top half 32 of the housing 30. Each of the plurality of arms 74 has a first end 76 and a second end 78 and a lateral edge 80 extending between the first end 76 and the second end 78. The lateral edge 80 of each of the plurality of arms 74 has a series of depressions 82 evenly spaced apart from each other and distributed along the lateral edge thereby defining a plurality of teeth 84 on the lateral edge 80. Additionally, each of the plurality of arms 74 has a foot 86 which is perpendicularly oriented with and extends upwardly from the second end 78 and the foot 86 on each of the plurality of arms 74 defines a respective one of the plurality of grips 72 of the gripping unit 70.

The plurality of arms 74 includes a pair of first arms 88 and a pair of second arms 90. Each of the pair of first arms 88 is slidably positioned in a respective one of the pair of first slots 42 in the first lateral side 40 of the perimeter wall 38 of the top half 32 of the housing 30. Each of the pair of second arms 90 is slidably positioned in a respective one of the pair of second slots 46 in the second lateral side 44 of the perimeter wall 38 of the top half 32. Additionally, each of the pair of first arms 88 has a channel 92 extending from the first end 76 of the first arms 88 toward the second end 78 of the first arms 88. Each of the pair of second arms 90 has a finger 94 extending away from the first end 76 of the second arms 90. Furthermore, the finger 94 on each of the pair of second arms 90 extends into the channel 92 in a respective one of the pair of first arms 88 thereby enabling each of the pair of second arms 90 to be retained in an aligned orientation with the respective first arm 88.

The gripping unit 70 includes a plurality of gears 96 and each of the plurality of gears 96 is rotatably disposed within the housing 30. Each of the plurality of gears 96 has a rotational axis which extends between the top wall 36 of the top half 32 of the housing 30 the bottom wall 48 of the bottom half 34 of the housing 30. Each of the plurality of gears 96 has an upper portion 98 which has a diameter that is less than a lower portion 100. The upper portion 98 of each of the plurality of gears 96 has a series of teeth 102 which is integrated into an outer surface 104 of the upper portion 98. Additionally, the lower portion 100 of each of the plurality of gears 96 has a series of teeth 106 which is integrated into an outer surface 108 of the lower portion 100.

The plurality of gears 96 includes a pair of first gears 107 and a pair of second gears 109. The plurality of teeth 106 on the outer surface 108 of the lower portion 100 of each of the pair of first gears 107 is enmeshed with the plurality of teeth 106 on the outer surface of the lower portion 100 of a respective one of the pair of second gears 109. The plurality of teeth 102 on the outer surface 104 of the upper portion 98 of each of the pair of first gears 107 is enmeshed with the plurality of teeth 84 on the lateral edge 80 of a respective one of the pair of first arms 88. Furthermore, each of the pair of first arms 88 is urged to travel outwardly from the respective first slot 42 when the pair of first gears 107 are rotated in a first direction and each of the pair of first arms 88 is urged to travel inwardly in the respective first slot 42 when the pair of first gears 107 are rotated in a second direction. The plurality of teeth 102 on the outer surface 104 of the upper portion 98 of each of the pair of second gears 109 is enmeshed with the plurality of teeth 84 on the lateral edge 80 of a respective one of the pair of second arms 90. Furthermore, each of the pair of second arms 90 is urged to travel outwardly from the respective second slot 46 when the pair of second gears 109 are rotated in a first direction and each of the pair of second arms 90 is urged to travel inwardly in the respective second slot 46 when the pair of second gears 109 are rotated in a second direction.

The gripping unit 70 includes a drive gear 110 which is rotatably disposed within the housing 30. The drive gear 110 has a rotational axis which extends between the top wall 36 of the top half 32 of the housing 30 the bottom wall 48 of the bottom half 34 of the housing 30. Additionally, the drive gear 110 has a plurality of teeth 112 integrated into an outer surface 114 of the drive gear 110. The drive gear 110 is positioned between the pair of second gears 109 such that the teeth 112 on the outer surface 114 of the drive gear 110 enmeshes the plurality of teeth 106 on the outer surface 108 of the lower portion 100 of second gears 96. In this way each of the pair of second gears 109 is rotated when each of the pair of first gears 107 is rotated.

A locking unit 116 is movably integrated into the scale 26 and the locking unit 116 is in mechanical communication with the gripping unit 70. The locking unit 116 is biased into a locked condition thereby inhibiting the gripping unit 70 from being adjusted such that the gripping unit 70 is secured against the box of wine 24. Conversely, the locking unit 116 is urgeable into an unlocked condition thereby enabling the gripping unit 70 to be adjusted such that the gripping unit 70 can be unsecured from the box of wine 24. The locking unit 116 comprises a locking arm 118 which has a finger 120 that is positioned on a primary end 122 of the locking arm 118 and a foot 124 that is positioned on a secondary end 126 of the locking arm 118. The locking arm 118 has a pivot point 128 which is located closer to the primary end 122 than the secondary end 126 and the pivot point 128 engages the top wall 36 of the top half 32 of the housing 30 and the bottom wall 48 of the bottom half 34 of the housing 30. The finger 120 on the primary end 122 engages a respective one of the plurality of teeth 106 on the outer surface 108 of the lower portion 100 of respective of the pair of first gears 107 thereby inhibiting the pair of first gears 107 and the pair of second gears 109 from rotating when the locking arm 118 is in a first position. Conversely, the finger 120 on the primary end 122 is displaced from the teeth 106 on the outer surface 108 of the lower portion 100 of the respective first gear 96 when the locking arm 118 is in a second position thereby enabling the pair of first gears 107 and the pair of second gears 109 to rotate.

The locking unit 116 includes a biasing member 130 which is located within the housing 30 and the biasing member 130 engages the foot 124 on the secondary end 126 of the locking arm 118. Furthermore, the biasing member 130 biases the locking arm 118 to pivot into the first position. The locking unit 116 includes a release button 132 which is slidably integrated into the perimeter wall 38 of the top half 32 of the housing 30 thereby enabling the release button 132 to be manipulated by the user 28. The release button 132 abuts an opposite side the foot 124 on the secondary end 126 of the locking arm 118 with respect to the biasing member 130. Furthermore, the locking arm 118 is pivoted into the second position when the release button 132 is pushed inwardly. In an alternative embodiment 134 as is most clearly shown in FIG. 8, the scale 26 is integrated into a basal wall 136 of the box of wine 24 such that the scale 26 is an integral component of the box of wine 24.

In use, the release button 132 is depressed to enable the arms 74 to be pulled outwardly from the housing 30 to facilitate the box of wine 24 to be positioned on the top wall 36 of the top half 32 of the housing 30. The arms 74 are subsequently pushed into the housing 30 until the foot 86 on each of the arms 74 abuts the box of wine 24 and the release button 132 is released to secure the box of wine 24 on the scale 26. The personal electronic device 12 is synchronized with the scale 26 and the optical reader on the personal electronic device 12 is employed to scan the bar code 22 on the box of wine 24 thereby uploading the weight characteristics of the box of wine 24 and the volume of wine contained in the box of wine 24 into the weight calculation program 14. In this way the weight of the box of wine 24 that is measured by the scale 26 can be analyzed with the weight calculation program 14 to determine the volume of wine that is contained in the box of wine 24 in terms of glasses of wine. Additionally, the physiological characteristics of the user 28 are entered into the weight calculation program 14 to enable the weight calculation program 14 to inform the user 28 when the user 28 has poured an appropriate amount of wine for consumption and when the user 28 has consumed more than the recommended amount of wine. Furthermore, the weight calculation program 14 informs the user 28 when the volume of wine contained in the box of wine 24 is nearly diminished to enable to user 28 to replace the box of wine 24 with a full box of wine 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A box wine weighing device for calculating the volume of wine remaining in a wine box and communicating the results to a personal electronic device, said device comprising:

a personal electronic device which stores a database comprising a weight calculation program;

a scale being structured to accommodate a box of wine thereby enabling said scale to weigh said box of wine, said scale being in remote communication with said personal electronic device thereby enabling said weight calculation program in said personal electronic device to calculate the volume of wine that remains in said box of wine wherein said personal electronic device is configured to enable a user to determine how many glasses of wine are left in said box of wine;

a gripping unit being movably integrated into said scale, said gripping unit including plurality of grips which can each be extended an adjustable distance from said scale thereby enabling said plurality of grips to grip said box of wine for retaining said box of wine on said scale; and a locking unit being movably integrated into said scale, said locking unit being in mechanical communication with said gripping unit, said locking unit being biased into a locked condition thereby inhibiting said gripping unit from being adjusted such that said gripping unit is secured against said box of wine, said locking unit being urgeable into an unlocked condition thereby enabling said gripping unit to be adjusted such that said gripping unit can be unsecured from said box of wine.

2. The device according to claim 1, wherein:

said scale comprises a housing which has a top half being movably attached to a bottom half;

said top half has a top wall and a perimeter wall extending downwardly from said top wall;

a first lateral side of said perimeter wall has a pair of first slots each extending into an interior of said housing;

a second lateral side of said perimeter wall has a pair of second slots each extending into said interior of said housing;

said bottom half has a bottom wall and a perimeter wall extending upwardly from said bottom wall;

said bottom wall is positionable on a horizontal support surface thereby enabling said box of wine to be positioned on said top wall; and a lower edge of said perimeter wall of said top half is spaced from an upper edge of said perimeter wall of said bottom half.

3. The device according to claim 1, wherein:

said personal electronic device includes a transceiver;

said scale includes a housing which has a top half being movably attached to a bottom half;

said scale includes a processing circuit being positioned within said housing;

said scale includes a plurality of weight sensors;

each of said plurality of weight sensors is positioned between said top wall of said top half and said bottom wall of said bottom half thereby enabling said plurality of weight sensors to sense the weight of said box of wine when said box of wine is positioned on said top wall of said top half;

each of said plurality of weight sensors is electrically coupled to said processing circuit;

said scale includes a transmitter being positioned within said housing;

said transmitter is electrically coupled to said processing circuit thereby enabling said transmitter to receive the weight sensed by said plurality of weight sensors;

said transmitter is in wireless communication with said transceiver in said personal electronic device;

said transmitter broadcasts the weight sensed by said plurality of weight sensors to said transceiver thereby enabling said weight calculation program in said electronic memory of said personal electronic device to calculate the volume of wine remaining in said box of wine;

said scale includes a display being pivotally integrated into said top wall of said top half of said housing;

said display is electrically coupled to said processing circuit;

said display is positionable in a deployed position having said display extending upwardly from said top wall of said top half wherein said display is configured to be visible to a user;

said display is positionable in a stored position having said display lying on a plane being oriented coplanar with said top wall of said top half;

said display displays indicia comprising numbers and letters to visually communicate the weight sensed by said plurality of weight sensors when said display is in said deployed position;

said scale includes a power supply being positioned within said housing;

said power supply is electrically coupled to said processing circuit; and said power supply comprises at least one battery.

4. The device according to claim 2, wherein:

said gripping unit includes a plurality of arms;

each of said plurality of arms is slidably positioned in said perimeter wall of said top half of said housing;

each of said plurality of arms has a first end and a second end and a lateral edge extending between said first end and said second end;

said lateral edge of each of said plurality of arms has a series of depressions being evenly spaced apart from each other and being distributed along said lateral edge thereby defining a plurality of teeth on said lateral edge;

each of said plurality of arms has a foot being perpendicularly oriented with and extending upwardly from said second end;

said foot on each of said plurality of arms defines a respective one of said plurality of grips of said gripping unit;

said plurality of arms includes a pair of first arms and a pair of second arms;

each of said pair of first arms is slidably positioned in a respective one of said pair of first slots in said first lateral side of said perimeter wall of said top half of said housing; and each of said pair of second arms is slidably positioned in a respective one of said pair of second slots in said second lateral side of said perimeter wall of said top half.

5. The device according to claim 4, wherein:

each of said pair of first arms has a channel extending from said first end of said first arms toward said second end of said first arms;

each of said pair of second arms has a finger extending away from said first end of said second arms; and said finger on each of said pair of second arms extends into said channel in a respective one of said pair of first arms thereby enabling each of said pair of second arms to be retained in an aligned orientation with said respective first arm.

6. The device according to claim 4, wherein:

said gripping unit includes a plurality of gears;

each of said plurality of gears is rotatably disposed within said housing;

each of said plurality of gears has a rotational axis which extends between said top wall of said top half of said housing said bottom wall of said bottom half of said housing;

each of said plurality of gears has an upper portion which has a diameter that is less than a lower portion;

said upper portion of each of said plurality of gears has a series of teeth being integrated into an outer surface of said upper portion;

said lower portion of each of said plurality of gears has a series of teeth being integrated into an outer surface of said lower portion;

said plurality of gears includes a pair of first gears and a pair of second gears;

said plurality of teeth on said outer surface of said lower portion of each of said pair of first gears is enmeshed with the plurality of teeth on the outer surface of the lower portion of a respective one of said pair of second gears;

said plurality of teeth on said outer surface of said upper portion of each of said pair of first gears is enmeshed with said plurality of teeth on said lateral edge of a respective one of said first arms;

said plurality of teeth on said outer surface of said upper portion of each of said pair of second gears being enmeshed with said plurality of teeth on said lateral edge of a respective one of said second arms.

7. The device according to claim 6, wherein:

each of said pair of first arms is urged to travel outwardly from said respective first slot when said pair of first gears are rotated in a first direction;

each of said pair of first arms is urged to travel inwardly in said respective first slot when said pair of first gears are rotated in a second direction;

each of said pair of second arms is urged to travel outwardly from said respective second slot when said pair of second gears are rotated in a first direction; and each of said pair of second arms is urged to travel inwardly in said respective second slot when said pair of second gears are rotated in a second direction.

8. The device according to claim 6, wherein:

said gripping unit includes a drive gear being rotatably disposed within said housing;

said drive gear has a rotational axis which extends between said top wall of said top half of said housing said bottom wall of said bottom half of said housing;

said drive gear has a plurality of teeth being integrated into an outer surface of said drive gear;

said drive gear is positioned between said pair of second gears such that said teeth on said outer surface of said drive gear enmeshes with said plurality of teeth on said outer surface of said lower portion of said pair of second gears thereby enabling each of said pair of second gears to be rotated when each of said pair of first gears is rotated.

9. The device according to claim 6, wherein:

said locking unit comprises a locking arm having a finger being positioned on a primary end of said locking arm and a foot being positioned on a secondary end of said locking arm;

said locking arm has a pivot point being located closer to said primary end than said secondary end;

said pivot point engages said top wall of said top half of said housing and said bottom wall of said bottom half of said housing;

said finger on primary end engages a respective one of said plurality of teeth on said outer surface of said lower portion of respective of said pair of first gears thereby inhibiting said pair of first gears and said pair of second gears from rotating when said locking arm is in a first position; and said finger on said primary end is displaced from said teeth on said outer surface of said lower portion of said respective first gear when said locking arm is in a second position thereby enabling said pair of first gears and said pair of second gears to rotate.

10. The device according to claim 9, wherein:

said locking unit includes a biasing member being located within said housing;

said biasing member engages said foot on said secondary end of said locking arm;

said biasing member biases said locking arm to pivot into said first position;

said locking unit includes a release button being slidably integrated into said perimeter wall of said top half of said housing wherein said release button is configured to be manipulated by the user;

said release button abuts an opposite side said foot on said secondary end of said locking arm with respect to said biasing member; and said locking arm is pivoted into said second position when said release button is pushed inwardly.

11. A box wine weighing device for calculating the volume of wine remaining in a wine box and communicating the results to a personal electronic device, said device comprising:

a personal electronic device which stores a database comprising a weight calculation program, said personal electronic device including a transceiver and an electronic memory and an optical scanner, said database being stored in said electronic memory, said optical scanner being enabled to read a bar code on a box of wine thereby enabling data pertaining to said box of wine to be uploaded into said electronic memory;

a scale being structured to accommodate said box of wine thereby enabling said scale to weigh said box of wine, said scale being in remote communication with said personal electronic device thereby enabling said weight calculation program in said personal electronic device to calculate the volume of wine that remains in said box of wine wherein said personal electronic device is configured to enable a user to determine how many glasses of wine are left in said box of wine, said scale comprising:

a housing having a top half being movably attached to a bottom half, said top half having a top wall and a perimeter wall extending downwardly from said top wall, a first lateral side of said perimeter wall having a pair of first slots each extending into an interior of said housing, a second lateral side of said perimeter wall having a pair of second slots each extending into said interior of said housing, said bottom half having a bottom wall and a perimeter wall extending upwardly from said bottom wall, said bottom wall being positionable on a horizontal support surface thereby enabling said box of wine to be positioned on said top wall, a lower edge of said perimeter wall of said top half being spaced from an upper edge of said perimeter wall of said bottom half;

a processing circuit being positioned within said housing;

a plurality of weight sensors, each of said plurality of weight sensors being positioned between said top wall of said top half and said bottom wall of said bottom half thereby enabling said plurality of weight sensors to sense the weight of said box of wine when said box of wine is positioned on said top wall of said top half, each of said plurality of weight sensors being electrically coupled to said processing circuit;

a transmitter being positioned within said housing, said transmitter being electrically coupled to said processing circuit thereby enabling said transmitter to receive the weight sensed by said plurality of weight sensors, said transmitter being in wireless communication with said transceiver in said personal electronic device, said transmitter broadcasting the weight sensed by said plurality of weight sensors to said transceiver thereby enabling said weight calculation program in said electronic memory of said personal electronic device to calculate the volume of wine remaining in said box of wine; and a display being pivotally integrated into said top wall of said top half of said housing, said display being electrically coupled to said processing circuit, said display being positionable in a deployed position having said display extending upwardly from said top wall of said top half wherein said display is configured to be visible to a user, said display being positionable in a stored position having said display lying on a plane being oriented coplanar with said top wall of said top half, said display displaying indicia comprising numbers and letters to visually communicate the weight sensed by said plurality of weight sensors when said display is in said deployed position;

a power supply being positioned within said housing, said power supply being electrically coupled to said processing circuit, said power supply comprising at least one battery;

a gripping unit being movably integrated into said scale, said gripping unit including plurality of grips which can each be extended an adjustable distance from said scale thereby enabling said plurality of grips to grip said box of wine for retaining said box of wine on said scale, said gripping unit comprising:

a plurality of arms, each of said plurality of arms being slidably positioned in said perimeter wall of said top half of said housing, each of said plurality of arms having a first end and a second end and a lateral edge extending between said first end and said second end, said lateral edge of each of said plurality of arms having a series of depressions being evenly spaced apart from each other and being distributed along said lateral edge thereby defining a plurality of teeth on said lateral edge, each of said plurality of arms having a foot being perpendicularly oriented with and extending upwardly from said second end, said foot on each of said plurality of arms defining a respective one of said plurality of grips of said gripping unit, said plurality of arms including a pair of first arms and a pair of second arms, each of said pair of first arms being slidably positioned in a respective one of said pair of first slots in said first lateral side of said perimeter wall of said top half of said housing, each of said pair of second arms being slidably positioned in a respective one of said pair of second slots in said second lateral side of said perimeter wall of said top half, each of said pair of first arms having a channel extending from said first end of said first arms toward said second end of said first arms, each of said pair of second arms having a finger extending away from said first end of said second arms, said finger on each of said pair of second arms extending into said channel in a respective one of said pair of first arms thereby enabling each of said pair of second arms to be retained in an aligned orientation with said respective first arm;

a plurality of gears, each of said plurality of gears being rotatably disposed within said housing, each of said plurality of gears having a rotational axis which extends between said top wall of said top half of said housing said bottom wall of said bottom half of said housing, each of said plurality of gears having an upper portion which has a diameter that is less than a lower portion, said upper portion of each of said plurality of gears having a series of teeth being integrated into an outer surface of said upper portion, said lower portion of each of said plurality of gears having a series of teeth being integrated into an outer surface of said lower portion, said plurality of gears including a pair of first gears and a pair of second gears, said plurality of teeth on said outer surface of said lower portion of each of said pair of first gears is enmeshed with the plurality of teeth on the outer surface of the lower portion of a respective one of the pair of second gears, said plurality of teeth on said outer surface of said upper portion of each of said pair of first gears being enmeshed with said plurality of teeth on said lateral edge of a respective one of said first arms, each of said pair of first arms being urged to travel outwardly from said respective first slot when said pair of first gears are rotated in a first direction, each of said pair of first arms being urged to travel inwardly in said respective first slot when said pair of first gears are rotated in a second direction, said plurality of teeth on said outer surface of said upper portion of each of said pair of second gears being enmeshed with said plurality of teeth on said lateral edge of a respective one of said pair of second arms, each of said pair of second arms being urged to travel outwardly from said respective second slot when said pair of second gears are rotated in a first direction, each of said pair of second arms being urged to travel inwardly in said respective second slot when said pair of second gears are rotated in a second direction; and a drive gear being rotatably disposed within said housing, said drive gear having a rotational axis which extends between said top wall of said top half of said housing said bottom wall of said bottom half of said housing, said drive gear having a plurality of teeth being integrated into an outer surface of said drive gear, said drive gear being positioned between said pair of second gears such that said teeth on said outer surface of said drive gear enmeshes with said plurality of teeth on said outer surface of said lower portion of said pair of second gears thereby enabling each of said pair of second gears to be rotated when each of said pair of first gears is rotated; and a locking unit being movably integrated into said scale, said locking unit being in mechanical communication with said gripping unit, said locking unit being biased into a locked condition thereby inhibiting said gripping unit from being adjusted such that said gripping unit is secured against said box of wine, said locking unit being urgeable into an unlocked condition thereby enabling said gripping unit to be adjusted such that said gripping unit can be unsecured from said box of wine, said locking unit comprising:

a locking arm having a finger being positioned on a primary end of said locking arm and a foot being positioned on a secondary end of said locking arm, said locking arm having a pivot point being located closer to said primary end than said secondary end, said pivot point engaging said top wall of said top half of said housing and said bottom wall of said bottom half of said housing, said finger on primary end engaging a respective one of said plurality of teeth on said outer surface of said lower portion of respective of said pair of first gears thereby inhibiting said pair of first gears and said pair of second gears from rotating when said locking arm is in a first position, said finger on said primary end being displaced from said teeth on said outer surface of said lower portion of said respective first gear when said locking arm is in a second position thereby enabling said pair of first gears and said pair of second gears to rotate;

a biasing member being located within said housing, said biasing member engaging said foot on said secondary end of said locking arm, said biasing member biasing said locking arm to pivot into said first position; and a release button being slidably integrated into said perimeter wall of said top half of said housing wherein said release button is configured to be manipulated by the user, said release button abutting an opposite side said foot on said secondary end of said locking arm with respect to said biasing member, said locking arm being pivoted into said second position when said release button is pushed inwardly.

12. The device according to claim 11, wherein said scale is integrated into a basal wall of said box of wine.

* * * * *